United States Patent [19]
Majoros

[11] Patent Number: 4,824,449
[45] Date of Patent: Apr. 25, 1989

[54] DEVICE FOR TRANSFORMING A FLUID FLOW

[76] Inventor: István Majoros, Widenstrasse 25, CH-6317 Oberwil, Switzerland

[21] Appl. No.: 44,501

[22] PCT Filed: Jun. 4, 1986

[86] PCT No.: PCT/EP86/00333
§ 371 Date: Mar. 20, 1987
§ 102(e) Date: Mar. 20, 1987

[87] PCT Pub. No.: WO86/07417
PCT Pub. Date: Dec. 18, 1986

[30] Foreign Application Priority Data

Jun. 4, 1985 [DE] Fed. Rep. of Germany ....... 3520032

[51] Int. Cl.⁴ .................. B01D 45/16; B04C 5/04
[52] U.S. Cl. ................ 55/459.1; 55/459.3; 55/460; 55/461; 210/512.1
[58] Field of Search .............. 55/203–205, 55/459 R, 459 C, 460, 461

[56] References Cited

U.S. PATENT DOCUMENTS

| | | | |
|---|---|---|---|
| 450,372 | 4/1891 | Morse | 55/459 R X |
| 658,832 | 10/1900 | Danvin | 55/459 R |
| 1,045,532 | 11/1912 | Dyblie | 55/459 R X |
| 1,915,678 | 6/1933 | Bour | 55/205 X |
| 2,015,464 | 9/1935 | Saint-Jacques | 55/459 R X |
| 2,187,646 | 1/1940 | Darrieus | 55/205 X |
| 2,888,096 | 5/1959 | Evans | 55/459 R X |
| 3,215,165 | 11/1965 | Boadway | |
| 3,282,030 | 11/1966 | Griffo et al. | 55/205 X |
| 3,426,513 | 2/1969 | Bauer | 55/459 R |
| 3,953,184 | 4/1976 | Stockford et al. | 55/461 X |
| 4,120,673 | 10/1978 | Nieden | 55/205 |
| 4,218,012 | 8/1980 | Hamza et al. | |
| 4,244,708 | 1/1981 | Bielefeldt | 55/459 R X |
| 4,390,351 | 6/1983 | Matsui et al. | 55/204 |
| 4,464,314 | 8/1984 | Surovikin et al. | 261/79 A |

FOREIGN PATENT DOCUMENTS

| | | |
|---|---|---|
| 50312 | 7/1984 | European Pat. Off. |
| 1128808 | 4/1962 | Fed. Rep. of Germany |
| 1241207 | 5/1967 | Fed. Rep. of Germany |
| 1248388 | 8/1967 | Fed. Rep. of Germany |
| 2741243 | 3/1979 | Fed. Rep. of Germany |
| 1005450 | 4/1952 | France |
| 2281158 | 3/1976 | France |
| 543427 | 8/1977 | U.S.S.R. .............. 55/204 |
| 556839 | 9/1977 | U.S.S.R. .............. 55/204 |

Primary Examiner—Robert Spitzer
Attorney, Agent, or Firm—Laff, Whitesel, Conte & Saret

[57] ABSTRACT

A device for transforming a fluid flow comprises a chamber with two lateral walls and a circular or spiral circumferential wall extending between the side walls. A flow duct ends tangentially to the circumferential wall in the chamber. An oblong core with circular cross-section is axially disposed in the chamber, which extends through a passage opening in a side wall forming an annular gap. The condition $w_1 \cdot r_1^n = w_2 r_2^n$ is to be substantially fulfilled for two optional points of the fluid flow within the chamber, with $r_i$ being the radial distance of the point $P_i$ from the axis of the circular arc or the spiral arc described by the circumferential wall, $W_i$ being the flow rate of the fluid at the point $P_i$ and n being a constant $0 < n < \infty$. An axial fluid flow can be transformed to a flow moving spirally in axial direction or vice versa with the device. Various application possibilities of this device are indicated.

21 Claims, 5 Drawing Sheets

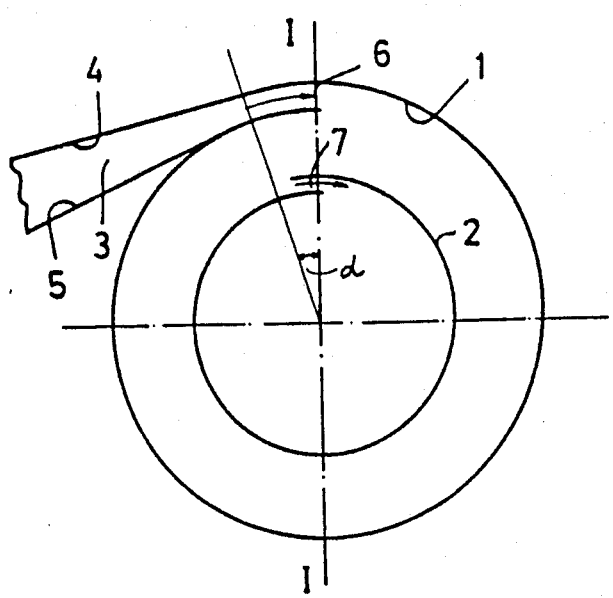
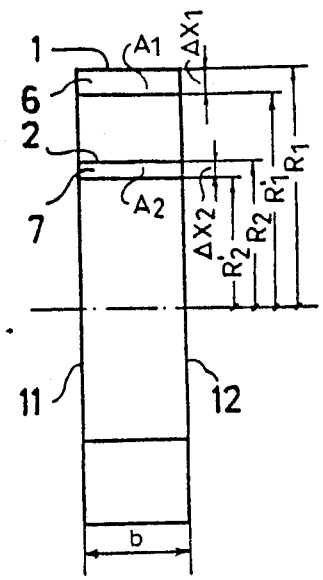
FIG. 1A     FIG. 1B
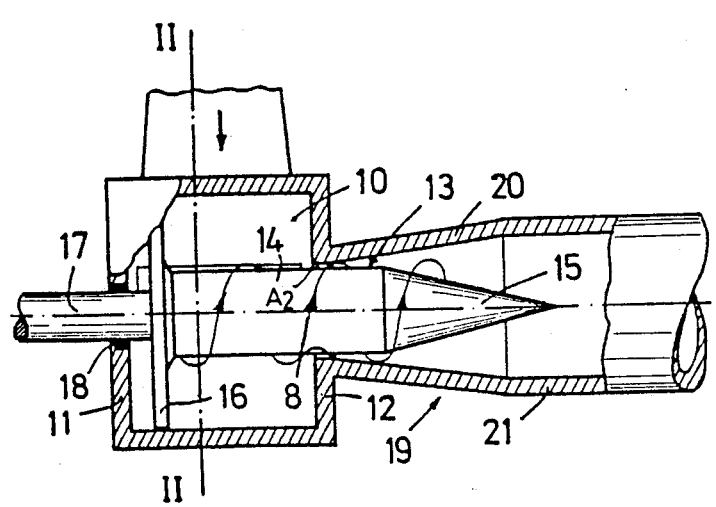
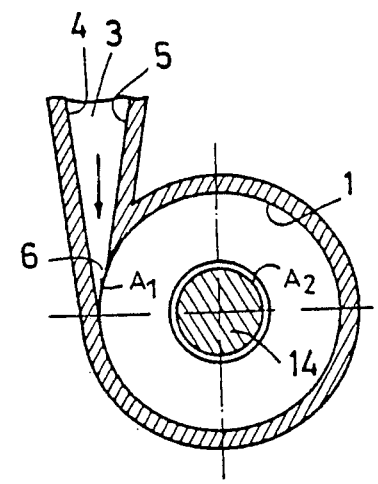
FIG. 2A     FIG. 2B

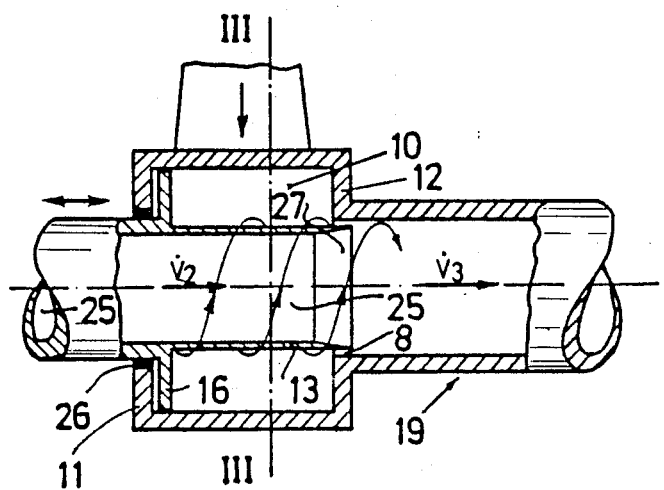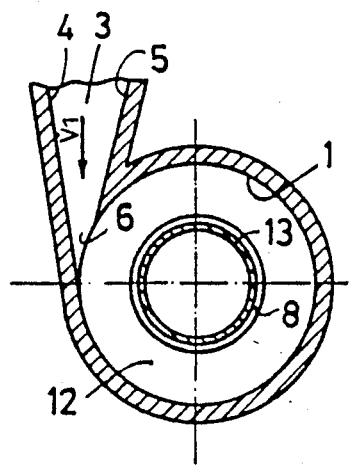
FIG. 3A  FIG. 3B
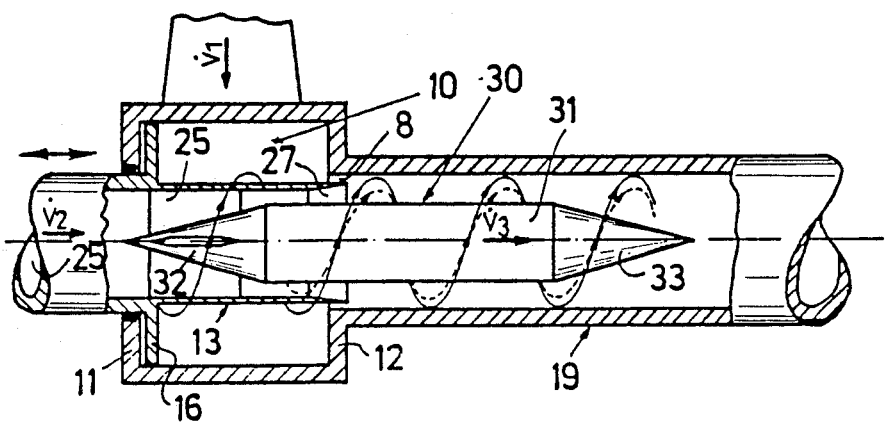
FIG. 4
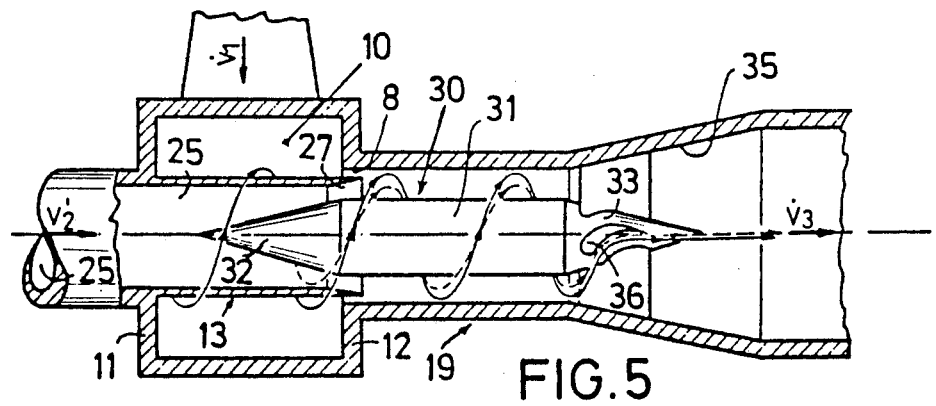
FIG. 5

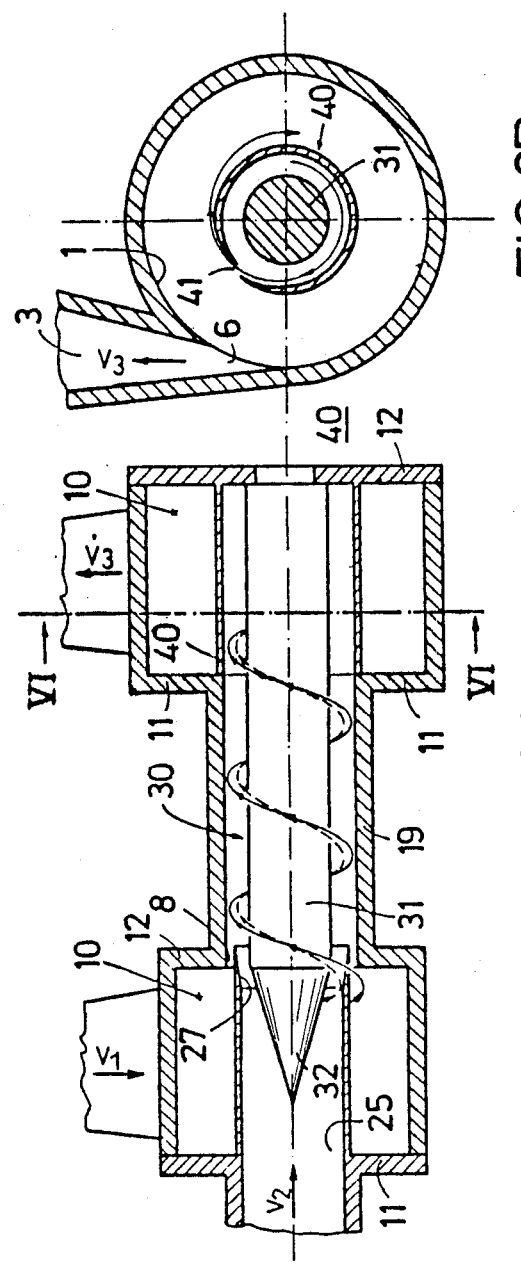

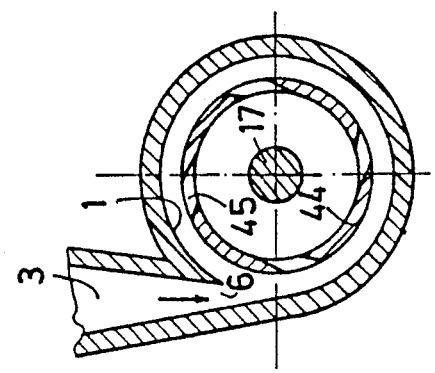
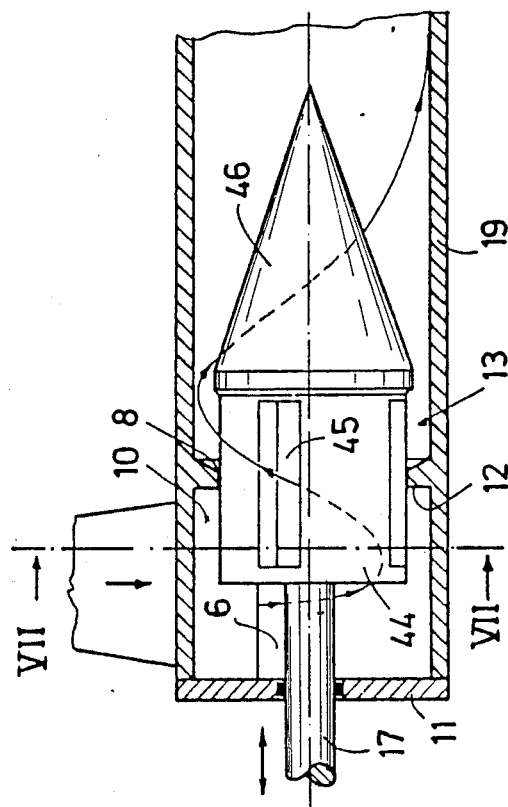

DEVICE FOR TRANSFORMING A FLUID FLOW

The invention relates to a device for transforming a fluid flow of a first type to a fluid flow of a second type.

Such devices are known from various fields of technology. There are cyclone dust separators which are of such construction, a dust-containing gas flowing at relatively high pressure through the flow duct ending tangentially in the chamber, a turbulent flow being formed within the chamber and the dust being accumulated at the circumferential wall of the chamber due to centrifugal force. The now cleaned gas can leave the cyclone separator through an axially disposed passage opening. The lateral wall of the chamber which comprises the axial passage opening does, in general, not extend vertically to the axis of the chamber, but at a relatively acute angle to the same, to keep flow losses small.

The invention is based on the need to further develop a device according to the preamble of claim 1 in such fashion that flow conditions which are as advantageous as possible are obtained.

According to the invention this problem is solved by the features indicated in the characterizing part of claim 1.

The basic idea of the invention produces within the chamber a fluid flow which has the form of a spiral potential eddy. Thus it is possible in a very effective manner to transform a fluid which is under a high pressure, but has a low flow rate to a fluid which has a high flow rate and a very low pressure.

The basic principle of the potential eddy is to be explained by means of the schematic representation in FIGS. 1A and 1B. It holds good in an eddy with closed flow paths that $r \times w =$ constant: where r is the distance of a point from the eddy axis and w is the flow rate of the fluid at this point. A spiral potential eddy is such an eddy in which the condition $r_1^n \times w_1 = r_2^n \times w_2$ is substantially fulfilled. The subindices 1 and 2 relate to two different points and n is a constant, with $0 < n < \infty$. If n is equal to 1, the conditions are as in a potential eddy with closed flow paths.

FIGS. 1A and 1B show sectional views of a chamber which is limited by a circumferential wall 1, which extends across a spiral arc, and lateral walls 11 and 12. According to the representation the circumferential wall 1 extends at an angle which is greater than 360° so that there is an overlapping area $\alpha$. The angle $\alpha$ can be up to about 30°. A flow duct ends tangentially into the chamber at the circumference of the chamber. The side walls 11 and 12 are planes. The circumferential wall 1 is a spirally extending plane surface. It is assumed here that the lateral walls of the tangential flow duct are plane with the lateral walls 11 and 12 of the chamber. It is furthermore assumed that the upper wall 4 and the lower wall 5 of the tangential flow duct 3 are also plane in each case and extend in each case vertically to the lateral walls so that the tangential flow duct 3 has a rectangular cross-section which is reduced towards the chamber. The tangential flow duct 3 turns into the overlapping area of the circumferential wall 1. There is then a passage area 6 at the inner end of the circumferential wall 1, which has a rectangular cross-sectional surface $A_1$.

A spiral guide surface 2 is disposed within the circumferential wall 1 concentrically to the circumference wall 1. This guide surface 2 extends across an angle which is at least 360°; however, it is greater than 360° in the representation according to FIG. 1A. Thus a passage area 7 is formed at the inner end of the spiral guide surface 2, which has the cross-sectional surface $A_2$. It is assumed that a fluid, in particular a liquid, enters the tangential flow duct and has the mean speed $w_1$ at the passage area 6. A spiral eddy flow is formed in the chamber between the siral circumferential wall 1 and the spiral guide surface 2, which flows out into the chamber through the passage area 7, which is limited by the inner surface of the spiral guide surface 2 and the two lateral walls 11 and 12 of the chamber. This chamber must of course have an outlet opening for the fluid.

In the representing according to FIG. 1A, the circumferential wall 1 extends along a spiral arc. By this wall, the fluid flow layer adjoining the circumferential wall has after a circulation of 360° which is substantially the same speed as the fluid flow layer which ends in the chamber at the inner end of the spiral circumferential wall 1. Due to this, no or almost no relative speed between the two fluid flow layers results so that no secondary eddy losses occur. If a fluid flows continuously through the chamber from the passage area 6 to the passage area 7, there is a fluid flow band being "wound up" spirally. There is substantially no relative speed between the individual layers of the flow band so that the friction between the fluid and the lateral walls 11 and 12 is substantially the greatest ions factor.

In FIG. 1B, the distance of the upper edge of the passage area 6 from the axis of the spiral is designated with $R_0$, the distance of the lower edge of the passage area 6 with $R_1$, the distance of the outer end of the spiral guide surface 2 with $R_2$ and the distance of the inner end of the spiral guide surface with $R'_2$.

The spiral guide surface is disposed within the circumferential wall 1 in FIGS. 1A and 1B, serving to explain the fundamental principle. This is however not necessary if an opening is provided in at least one of the lateral walls 11, 12, through which the fluid flowing in eddy-like fashion flows out maintaining its eddy flow in axial direction.

It is still pointed out that if the height of the passage area 6, which is equal to $R_0$ minus $R_1$ has a relatively small value a fluid flow in the form of a spiral potential eddy can be obtained, if the circumferential wall 1 extends along a circular arc. Then there can be such conditions that the relative speed between the fluid flowing through the passage area 6 and the fluid having carried out substantially a first complete circulation is relatively small so that only slight flow or friction losses occur.

If an oblong core with a circular cross-section is disposed in the chamber, which extends through an opening forming an annular gap in one of the lateral walls, the flow circulating near the circumference of the oblong core can flow out through the annular gap, maintaining substantially its eddy movement. If a cylindrical flow duct adjoins the passage opening, which has the same diameter as the passage opening, the fluid flows through this flow duct across a long path maintaining its eddy movement. In the course of time, the eddy speed of the fluid flow decreases due to the friction and a normal axial fluid flow develops. If the flow duct is subsequently enlarged at the passage opening in the lateral wall, this enlargement acts as a diffusor so that an increasing increase in pressure of the fluid takes place in the axial direction of the diffusor.

The oblong core can advantageously also have a continuous inner flow duct extending in axial direction, which ends towards the exterior of the chamber at the end which is remote from the annular gap. A partial vacuum is generated at the end of the oblong core, which extends in a flow duct adjoining the annular gap at the opening of the inner flow duct of the core so that a fluid can be sucked in through the inner flow duct. The fluid entering the chamber and flowing out in a spiral fashion through the annular gap would be a propelling fluid in this case. Due to the spiral flow of the propelling fluid passing through the annular gap the propelling jet flows continuously without fluttering so that this arrangement has a high degree of efficiency.

If, according to an advantageous further development of the invention, a further oblong core is disposed in the inner flow duct of the oblong core, whose end sections taper in each case. Preferably, the end sections are conically pointed so that one of the tapering end sections extends into the inner flow duct. The fluid flowing through the inner flow duct also experiences at least in the end portion of the inner flow duct a spiral rotation so that the propelling fluid and the fluid flowing out of the inner flow duct mix well without additional eddy formation consuming energy.

According to another further development of the invention, an actuator extending transversely to the axis of the chamber is provided in the chamber, which reaches at least up to close to the inner surface of the circumferential wall. The circumferential surface of the actuator can also be in contact with the inner wall of the circumferential wall or sealing means can be provided between the circumferential wall of the actuator and the inner surface of the circumferential wall of the chamber. This actuator can preferably be moved along the axis of the chamber so that the chamber can be subdivided into two chambers. It is assumed that the actuator is disposed in the central plane of the chamber.

If fluid flows into the chamber, a spiral flow can only develop in the area of the chamber, which is limited by the actuator and the lateral wall having the passage opening, because only here fluid can flow out through the annular gap. There is also fluid in the other part of the chamber, because fluid can still flow from the tangential flow area into this part of the chamber through the passage area. However, this fluid remains "stationary" and has a pressure as it is present in the passage area.

Since there is still a spiral fluid flow in the part of the chamber connected to the annular gap, the fluid flows uniformly through this part of the chamber.

It is pointed out that, if the actuator is very close to the lateral wall, through which the oblong core extends forming an annular gap, the friction losses at the lateral wall and the surface of the actuator may be so high that the formation of a spiral eddy flow of the fluid is strongly hindered or even prevented. In this case there would be flow conditions as they are the case in the known valves, e.g. disk valves, where uncontrollable eddies are formed in the passage gap. If, however, the mentioned friction forces do not prevent the formation of a spiral flow, a uniform flow is maintained and since no uncontrollable eddies are formed, there is also no disturbing noise.

The oblong core can be disposed stationarily within the framework of the invention and the actuator can be displaceable relative to the core. It is, however, also possible to firmly connect the actuator to the core and to dispose the oblong core displaceably. These two possibilities can also be used within the framework of the invention, if the oblong core has a continuous, inner flow duct. However, then care must be taken that, if the actuator is firmly connected to the oblong core, the core is sufficiently long so that, independently of its displacement position, it extends through the chamber from one side wall to the opposite one. The fluid contained in the chamber is prevented from entering the inner flow duct of the oblong core.

The oblong core may also be designed as a hollow cylinder within the framework of the invention, which extends through the passage opening and contacts with its casing surface the inner circumferential surface of the passage opening.

The end of the hollow-cylindrical core projecting beyond the passage opening is closed. Oblong passage slots are formed in the cylinder casing which extends preferably in parallel to the longitudinal axis of the oblong, hollow-cylindrical core. A cone adjoins preferably the closed end of the oblong core, which tapers starting off at the oblong core.

Since in this design according to the invention the hollow-cylindrical core is open towards the chamber, the fluid flowing in eddy fashion can enter the core and flow out through the areas of the slot from the core maintaining its eddy flow, which are outside the passage opening. The longitudinal surfaces of the slots across which the fluid flows should be designed so that flow losses being as small as possible occur to obtain advantageous flow conditions. These flow surfaces of the slots may e.g. be plane and inclined or also provided with a flow-advantageous profile.

According to an advantageous further development the oblong core has at its downstream end a conically tapering and section to obtain advantageous flow conditions. The invention also covers that the entire core tapers towards its downstream endd. The result of this is that if the oblong core is displaced in the direction of its longitudinal axis, the passage surface of the annular gap can be changed as a function of the displacement position of the oblong core.

If it is desired to have substantially exclusively an axial flow already at a small distance from the chamber, guide elements may be provided in the flow duct in which the core extends or at the downstream end of the core, preferably in its tapering section, which deflect the eddy flow in the direcion to an axial flow. If an increase in pressure is to be achieved downstream of the chamber as quickly as possible, a diffusor may be provided.

In the foregoing discussions, a fluid enters through the flow duct disposed tangentially to the chamber and leaves through the annular gap. It is, however, also possible to reverse the direction of flow and to supply an eddying flow with a reversed direction, also from outside of the chamber. Due to this, the flow conditions discussed so far are reversed, i.e. a spiral eddy circulating in reversed direction is produced in the chamber, the fluid then reducing its flow rate towards the circumferential wall of the chamber and flowing finally out through the tangential flow duct with pressure build-up.

It depends of course on the object aimed at to what extent the flow conditions can be reverse in each case.

It is also possible according to the invention to flow-connect at least two of the devices according to the invention. A possibility consists in providing two chambers, whose lateral passage openings are connected to each other via a circular cylindrical pipe piece. A common core extends through the two chambers and the connecting pipe.

If a fluid enters one of the chambers through the tangential flow duct, it flows in along the same spiral potential eddy and flows out through the annular gap of the chamber rotating spirally about the oblong core. The fluid moves maintaining its eddy flow, in the longitudinal direction of the core and enters the other chamber through the annular gap thereof. In this chamber it flows along a spiral potential eddy from the oblong core towards the outside to the circumferential wall of this other chamber and finally flows out of the chamber through the tangential flow duct. The tangential flow duct through which the fluid flows out must of course be oriented in accordance with the eddy rotation in the chamber connected to it. With this described arrangement of two devices according to the invention one obtains flow conditions which are comparable to a Venturi tube. The device on the flow-in side acts as a diffusor and the device on the flow-out side as a confusor. This means in other words that fluid with a low flow rate and high pressure is transformed to a fluid with high flow rate and low pressure and thereupon to a fluid with low flow rate and high pressure.

According to an advantageous further development an axial, oblong core can additionally be disposed rotatably in a design according to FIG. 1 which was already discussed to explain the fundamental principle of the invention, at which guide elements extending in radial direction are attached, which extend as close to the spiral guide surface 2 as possible (FIG. 1A).

An axial opening is provided in at least one of the side walls, through which a fluid can enter. If the oblong core is set rotating by a driving means such as a motor, fluid which is enclosed by the spiral guide surface is also set rotating and flows out into the chamber which is limited by the outer surface of the spiral guide surface and the circumferential wall through the passage area between the ends of the guide surface. A vacuum is formed at the opening provided at the axial side so that further fluid can be sucked at that opening. In the chamber limited by the spiral guide surface and the circumferential wall a spiral fluid potential eddy is formed and the fluid flows finally through the passage area limited in radial direction by the circumferential wall and flows out via the tangential flow duct. The flow conditions are thus opposite to those outlined in FIG. 1A with the arrows designated with $w_1$ and $w_2$. The guide elements extending in a radial direction from the oblong core can advantageously be designed in such fashion that their radial extension depends on the angle of rotation of the rotatable, oblong core. Due to this, according to the invention, the guide elements have their ends remote from the axis across the largest angular area of their circumferential rotation as close as possible or preferably in contact with the inner surface of the spiral guide surface. In this fashion an effective fluid movement or fluid conveyance is achieved.

The following is pointed out:

As already discussed within the framework of the invention, the aim is to obtain a spiral potential eddy within the respective chamber. Due to the validity of the continuity equation, the amount of fluid flowing into the chamber per time unit is equal to the amount of fluid flowing out of the fluid chamber per time unit. The flow rate of the fluid in the different positions of the spiral potential eddy depends furthermore on the shaping of the lateral walls. If the lateral walls of the chamber approach each other towards the axis of the chamber, the surface of the fictitious passage gap is reduced if its height remains unchanged in a radial direction. Due to this also, a change in the flow rate of the fluid results. These reflections must be taken into consideration when dimensioning the chamber, the oblong core and the flow passage areas.

If an actuator is provided in the chamber, it can also be designed in accordance with a lateral side wall extending obliquely.

The invention is now explained in more detail by means of examples of embodiments with reference to the drawing.

FIGS. 1A and 1B show a schematic representation of a device according to the invention to explain the basic idea of the invention.

FIG. 2A shows a longitudinal section of a first embodiment according to the invention.

FIG. 2B shows a sectional view along the line II—II of FIG. 2A.

FIG. 3A shows a second embodiment of a device according to the invention.

FIG. 3B shows a sectional view along the line III—III of FIG. 3A.

FIG. 4 shows a third embodiment according to the invention.

FIG. 5 shows a fourth embodiment according to the invention.

FIG. 6A shows a fifth embodiment according to the invention.

FIG. 6B shows a sectional view along the line VI—VI of FIG. 6A.

FIG. 7A shows a sixth embodiment according to the invention.

FIG. 7B shows a sectional view along the line VII—VII of FIG. 7A.

In the subsequent description of the embodiments the same parts are deisgnated with the same reference numerals.

Figure 8:
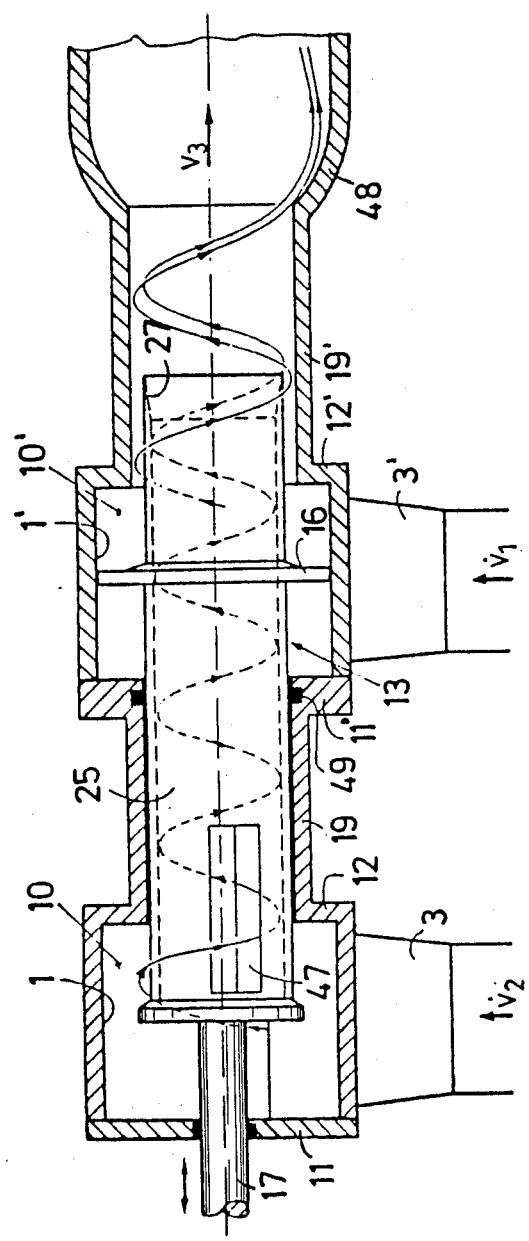
FIG. 8 shows a seventh embodiment according to the invention.

FIGS. 2A and 2B show a first embodiment according to the invention. A chamber 10 is limited by the inner circumferential wall 1, which extends along a spiral arc, and by lateral walls 11 and 12 which are disposed vertically to the axis of the spiral circumferential wall 1. An inlet duct 3 ends tangentially in the chamber 10, which is limited by walls 4 and 5 extending in parallel to the axis of the chamber and by lateral walls (not shown). The tangential inlet duct 3 ends in the chamber 10 at a first passage area 6. The passage area 6 has a surface $A_1$ and is of a rectangular cross-section. The lateral walls 4 and 5 of the inlet duct 3 pass over tangentially into the end sections of the circumferential wall 1.

The lateral wall is designed with a circular passage opening 8. An oblong core 13 is disposed in the chamber 10 concentrically to the axis of the chamber, which extends forming an annular gap with the cross-sectional surface $A_2$ through the lateral wall 12 of the chamber 10 towards the outside. According to the representation in FIG. 1A the core 13 has a circular cylindrical section 14 and an adjoining, conically tapering section 16. A plateshaped actuator is mounted at the end of the cylindrical section 14 remote from the annular gap, which extends vertically to the axis of the chamber and is with its circumferential surface in direct proximity of the inner surface of the circumferential wall 1. The circumferential surface of the actuator 16 can also contact the inner surface of the circumferential wall 1 or sealing means can also be provided between the circumferential surface of the actuator 16 and the circumferential wall 1. Since the circumferential wall 1 extends along a spiral arc and the circumferential surface of the actuator 16 is in the direct proximity of the circumferential wall 1 or possibly contacts the same wall, means should be provided which prevent a rotation of the core 13. If such means are not provided, there is the risk that upon a rotation of the core 13 the circumferential surface of the actuator 16 may jam with the circumferential wall 1.

An opening 18 is provided in the lateral wall 1, through which a rod 17 extends which is fastened on one end to the actuator 16 or to the core 13 itself. A sealing means not designated in more detail such as an O-ring is provided between the inner surface of the opening 18 and the rod 17. The rod 17 serves for making an axial displacement of the core 13 and the actuator 16 fastened to it possible.

A flow duct 19 adjoins the passage opening 8 outside the chamber 10, which has a conically enlarging section 20 which adjoins the lateral wall 12 direction, which is adjoined by a cylindrical pipe 21 of constant cross-section.

The annular gap formed between the cylindrical section 14 and the passage opening 8 can be seen in FIG. 2B.

The width of the passage area on the inlet side extends substantially across the entire width of the chamber, however there being space provided on both sides of the inlet-side passage area to receive the actuator 16 in its respective end positions.

In the position of the core 13 and the actuator 16 shown in FIG. 1A, the actuator 16 designed in plate form has such a position, in which the actuator 16 subdivides the inlet-side passage area 6 into two sections.

If a fluid flows in through the tangential inlet duct 3, it flows on the one hand into the partial chamber of the chamber 10, which is limited by the actuator 16 and the lateral wall 11 and on the other hand into the partial chamber of the chamber 10, which is limited by the actuator 16 and the lateral wall 12. The chamber 10 is subdivided into a small partial chamber and into a large partial chamber on the side of the passage opening 8 according to the representation in FIG. 2A. If the fluid flows into the chamber through the inlet-side flow duct 3, both partial chambers of the chamber are filled. Since fluid can flow out through the annular gap between the cylindrical section 14 of the core 13 and the inner wall of the passage opening 8, an eddy flow in the form of a spiral fluid potential eddy develops in the larger partial chamber of the chamber. No flow develops in the smaller partial chamber of the chamber 10, because no outlet opening is provided. After the development of the spiral fluid potential eddy a corresponding spiral fluid flow develops in the larger partial chamber of the chamber 10, whose flow rate is greatest at the circumferential area of the cylindrical section 14. The fluid flow circulating in the direct proximity of the circumferential surface of the cylindrical section 14 of the core 13 flows out of the chamber maintaining its rotational movement through the annular gap and gets as a rotational flow displacing itself axially into the conically enlarging pipe section 20. Since the oblong core 13 has a conically tapering end section 15, no uncontrolled eddies occur, but the fluid flows along a spiral in axial direction. Since the pipe section 20 is conically enlarged, the rotational speed of the fluid flow is correspondingly changed. The flow flows then into the cylindrical pipe section 21 maintaining its rotational movement, which reduces the axial pipe flow resistance and whose speed decreases with the time due to pipe friction so that finally an axial flow sets in.

Due to the axial displacement of the core 13 by means of the rod 17 from outside the chamber 10, the cross-sectional surface of the inlet-side passage area can be changed, i.e. to be exact, the inlet side passage area into the part of the chamber 10 which is limited by the lateral wall 12 and the actuator 16. If the surface of this inlet-side passage area is reduced only a smaller amount of fluid can enter the chamber 10 per time unit. Due to the displacement of the core 13 the amount of fluid passage can thus be changed. Thus also the difference in pressure between the inlet-side fluid pressure and the outlet-side fluid pressure is changed, if the same has been built up again by transforming the kinetic energy of the fluid.

The characteristic line which indicates the relationship between the rate of flow per time unit and the difference in pressure between the inlet side and the outlet side depends on the respective cross-sectional ratio between the surface of the inlet-side passage area and the outlet-side passage area, i.e. the surface of the annular gap. The course of the mentioned characteristic line can be influenced by changing this ratio. A preferably conical section tapering in the direction towards the passage opening 8 can be used according to the invention instead of a cylindrical section 14 of the core 13, which is adjoined by the conical section 15, or the entire core 13 can be designed in conically tapered fashion. If there is such a design of the core 13, the surface of the annular gap changes as a function of the displacement position of the core 13. The smaller the distance between the actuator 16 and the lateral wall 12 is, the smaller does the cross-sectional surface of the annular gap become.

FIG. 3A shows a second embodiment in partial longitudinal section, whereas FIG. 3B shows a cross-section along the line III—III of FIG. 3A.

This embodiment differs from that according to FIGS. 2A and 2B substantially in that the oblong core 13 has a cylindrical section and is formed with an inner flow duct 25 with a flared end 27, which extend in longitudinal direction of the oblong core 13. The core 13 extends furthermore through one axial opening 26 formed in the lateral wall 11. The core 13 is sealingly guided in this opening 26 by means of a sealing means such as an O-ring. In this embodiment a cylindrical pipe piece 19 adjoins the lateral wall 12 of the chamber 10, which has the same internal diameter as the passage opening 8 in the lateral wall 12.

The core 13 can be axially moved, whereby the length of the end section can be changed, with which the core 13 extends into the pipe 19, an annular gap between the outer surface of the end section of the core 13 and the inner wall of the passage opening 8 being also always formed here.

Also here an actuator 16 is provided which is designed in the same fashion as in the first embodiment and has the same function.

If a fluid flows into the chamber 10 through the tangential flow duct 3, a spiral potential flow is built up as in the first embodiment, whose flow layer near the core has a high flow rate. This flow layer can flow in axial direction into the pipe 19 through the annular gap maintaining its rotational movement. Due to this a partial vacuum is formed in the pipe 19 so that there is a partial vacuum at the opening of the inner flow duct 25 remote from the chamber (not shown) so that a fluid can be sucked in through this opening of the inner flow duct 25 remote from the chamber. Thus the effect of a jet pump results.

Due to the axial displacement of the core 13 the actuator is also displaced so that as in the first embodiment the amount of fluid flow through the chamber 10 can be changed. Thus also the partial pressure at the opening of the inner flow duct 25 ending in the pipe 19 is changed, which entails that the suction ability is also changed. If one regards the fluid flowing through the chamber 10 as a propelling fluid, the suction effect of the device can be changed by changing the amount of propelling fluid flow.

The third embodiment according to the invention represented in FIG. 4 differs from that of FIG. 3A in that a further oblong core 30 is provided which has a central cylindrical section 31 and end sections 32 and 33 conically tapering away from it. The cylindrical section 31 has a circular cross-sectional surface and such a diameter that the circumferential surface of the cylindrical section 31 is spaced from the inner wall of the inner flow duct 25. According to the representation in FIG. 4 the further oblong core 30 extends with its one end section 32 and a section of its cylindrical section 31 into the inner flow duct 25 and defines an annular gap for the suction jet. The volume flow ratio between propelling jet and suction jet can be influenced by selecting the size of the annular gap.

The difference between the working method of the second embodiment according to FIGS. 3A and 3B and the third embodiment according to FIG. 4 consists substantially in that due to the rotational movement of the fluid passing through the annular gap, a rotational movement is also forced on the fluid entering through the inner flow duct 25 in the area of the opening, in which the further oblong core 30 extends. In FIG. 4 the course of the flow of the fluid flowing through the chamber 10 is represented by an unbroken, spiral line. The interrupted spiral line is to outline the course of the flow of the fluid entering through the inner flow duct 25. It is achieved in advantageous fashion that the fluid flowing out of the annular gap and the fluid flowing out of the inner flow duct 25 into the pipe 19 are rapidly mixed due to their common rotational movement.

FIG. 5 shows a fourth embodiment which substantially differs from the third embodiment according to FIG. 4 in that the core 13 is stationary and cannot be displaced, that a conically enlarged pipe section 35 adjoins the cylindical pipe and that the downstream end section 33 of the further oblong core 30 is formed with guide elements 36.

Apart from the fact that no actuator is provided in this fourth embodiment and thus also the amount of fluid flow through the chamber 10 cannot be changed, the working method is the same as in the third embodiment. However, a difference consists in that the conically enlarged pipe section 35 which adjoins the cylindrical pipe 19 acts as a diffusor, whereby the flow rate of the fluid flow is reduced. The guide elements 36 which the cone-shaped end section 33 has serve furthermore to deflect the rotational flow movement of the fluid so that as quickly as possible an exclusively axial flow is achieved. Due to this one obtains already at a short distance from the conically enlarged pipe section 35 a substantial pressure build-up and thus there is only still a slight rotational movement of the flow or none at all. The embodiment represented in FIG. 5 can e.g. be used as mixing device for two fluids.

FIGS. 6A and 6B show a fifth embodiment of the invention. This fifth embodiment differs from the fourth embodiment according to FIG. 5 in that a device 40 adjoins the cylindrical pipe 19 instead of a conically enlarged pipe section 35, which also has a chamber 10 which is limited by lateral walls 11 and 12 and a spiral circumferential wall 1. An outlet duct 3 ends tangentially also in this chamber 10.

The downstream end of the pipe 19 is directly connected to the chamber 10, i.e. a corresponding passage opening is provided in the lateral wall is provided with a corresponding passage opening. A hollow cylinder 40 is disposed axially concentrically in the chamber 10. Passage slots 41 extending in parallel to the axis of the cylinder are formed in the casing of the hollow cylinder 40. According to FIG. 6A the downstream end section of the further oblong core 30 does not taper, but maintains its cylindrical form like the cylindrical section 31. A fluid flowing through the left chamber in FIG. 6A experiences in this chamber 10 a spiral flow movement and enters through the annular gap into the pipe 19 maintaining the rotational movement. Fluid sucked in through the inner flow duct 25 also flows spirally through the pipe 19, namely both fluids flow jointly spirally around the cylindrical section 31 and move in axial direction towards the righthand side in FIG. 6A. The fluid flowing around the cylindrical section 31 gets into the interior of the hollow cylinder 40 maintaining its rotational movement. Since the hollow cylinder 40 is provided with passage slots 41 extending in axial direction the fluid can flow through these slots and get into the chamber 10 which is the righthand one in FIG. 6A. There is also a spiral fluid potential eddy in this chamber whose outermost flow layer can get through the passage area 6 from the chamber 10 into the tangential flow duct 3. Thus there is a pressure built-up in the tangential flow duct 3 because the flow rate decreases with increasing radius.

The surfaces of the passage slots 41 extending in axial direction are advantageously formed in such fashion that the flow resistance is as small as possible for the passage of the fluid.

FIGS. 7A and 7B show a longitudinal section or cross-sectional view of a sixth embodiment according to the invention. As in the other embodiments also here a chamber 10 is provided which is limited by a circumferential wall 1 extending along a spiral arc and lateral walls 11, 12. An opening 8 is formed in the lateral wall 12. A pipe section 19 adjoins the lateral wall 12 in the area of the opening 8, which has a larger diameter than the opening 8. A core 13 has a hollow cylindrical section 44 to which a conically tapering section 46 adjoins preferably downstream. At the connection point between the hollow cylindrical section 44 and the conical section 46 the hollow cylindrical section 44 is closed. A rod 17 is centrically fastened to the end of the section 44 closed by the base surface of the section 46, which extends through the hollow cylindrical section 44 and through an opening (not shown) in the side wall 11 towards the outside of the chamber 10. The rod 17 is sealingly guided in the opening (not shown) of the lateral wall 12. The external diameter of the hollow cylindrical section 44 is selected so large that the circumferential surface of the hollow cylindrical section 44 rests substantially sealingly against the inner surface of the opening 8. A sealing means can also be provided to achieve a reliable sealing. Passage slots 45 extending in axial direction are formed in the casing of the hollow cylindrical section 44.

With reference to FIGS. 7A and 7B only those parts are described which have not been mentioned as yet in connection with the preceding embodiments.

If a fluid flows through the chamber 10 which gets into the chamber 10 through the tangential flow duct 3, also here a spiral circulation flow develops whose speed is highest near the rod 17 within the chamber 10. This circulating flow continues in the interior of the hollow cylindrical section 44 which is open towards the chamber 10. The fluid flow circulating in the hollow cylindrical section 44 can flow out through the passage slots 45 in the area of these slots, which extends substantially within the pipe section 19. Since the flow within the hollow cylindrical section 44 is a circulating or eddying flow, the fluid flows out through the mentioned areas of the passage slots 45 and gets into the chamber between the section of the hollow cylindrical section 44, which extends into the pipe 19, and the inner wall of the pipe 19. The cone-shaped section 46 of the core 13 supports a uniform flow so that the occurrence of undesired turbulences is hindered. Since the fluid enters the pipe 19 with a rotational movement component, it continues flowing spirally in this pipe until the rotational flow components get smaller and smaller in the course of time so that there is finally an axial fluid flow.

The surfaces of the passage slots 45 extending in axial direction are preferably formed in such fashion that no losses occur, i.e. these surfaces are adapted to the fluid flow.

The amount of fluid flowing through the chamber 10 and getting into the pipe 19 can be changed by displacing the oblong core, which is possible from the outside by means of the rod 17.

The seventh embodiment represented in FIG. 8 is an example of the fact in which fashion different embodiments discussed so far can be combined with each other. Two chambers 10, 10' with lateral walls 11, 12 or 11', 12' are flow-connected with each other via a pipe section 19. A pipe section 19' adjoins the lateral wall 12' of the chamber 10', which is adjoined by a toroidally enlarged pipe section 48. An oblong core 13 extends from the chamber 10 up into the pipe section 19'. This core 13 can be displaced in axial direction by means of the rod 17 projecting from the chamber 10. The core 13 is designed with an inner flow duct 25, the axial opening of which located in the chamber 10 is closed. The end section of the core 13 which points to the chamber 10 is formed with axial passage slots 47. There is an actuator 16 in the chamber 10', which extends from the circumferential surface of the core 13 to the circumferential wall 1' of the chamber 10' and is designed in corresponding fashion as the actuators 16 already described in connection with the other embodiments. This actuator 16 in the chamber 10' has also the same function as the actuators already described.

The core 13 is sealingly guided in the lateral wall 11' of the chamber 10' and a seal 49 for sealing is provided. The inner diameter of the pipe section 19 is only slightly larger than the outer diameter of the oblong core 13. The inner diameter of the pipe section 19' is somewhat larger than the outer diameter of the core 13, which has altogether the form of a hollow cylinder so that an annular duct is formed in the area of the pipe section 19'.

If a fluid flows through the chamber 1, which enters the chamber through the tangential flow duct 3 allocated to it, a spiral fluid flow develops which also flows at least partly around the end section of the core 13 projecting into the chamber 10 and gets into the inner flow duct 25 of the oblong core 13 through the area of the passage slots 47 located in the chamber 1 into the inner flow duct 25 of the oblong core 13. The fluid flow is spiral in the interior of the flow duct 25 as it is outlined by the interrupted line. The fluid flow gets through the open end conically enlarged at 27 from the interior of the flow duct 25 into the pipe section 19'.

The part of the embodiment according to FIG. 8 which comprises the tangential flow duct 3' and the chamber 10' corresponds essentially to the second embodiment according to FIGS. 3A and 3B.

The embodiment according to FIG. 8 can be used for mixing two fluids or also as a jet pump. In the first case the fluids flow into the chambers 10 and 10' in each case under the effect of a positive pressure. In the last-mentioned case the fluid flows into the chamber 10' under a positive pressure and a partial vacuum is formed in the area of the pipe section 19', which propagates through the inner flow duct 25, the passage slots 47, the chamber 10 up to the tangential flow duct 3. Due to this a fluid can be sucked in through the tangential flow duct 3, which gets into the pipe section 19' at the open end of the inner flow duct 25. In this embodiment both fluids have a spiral flow in the pipe section 19'. The toroidally enlarged pipe section 48 acts as a diffusor so that the rotational component of the flow gets smaller and an axial flow develops in the course of time.

The length of the passage slots 47 is selected in such fashion that the passage slots 47 extend in longitudinal direction substantially across the entire width of the chamber 10, if the oblong core 13 is displaced completely to the left in FIG. 8.

Figure 9:
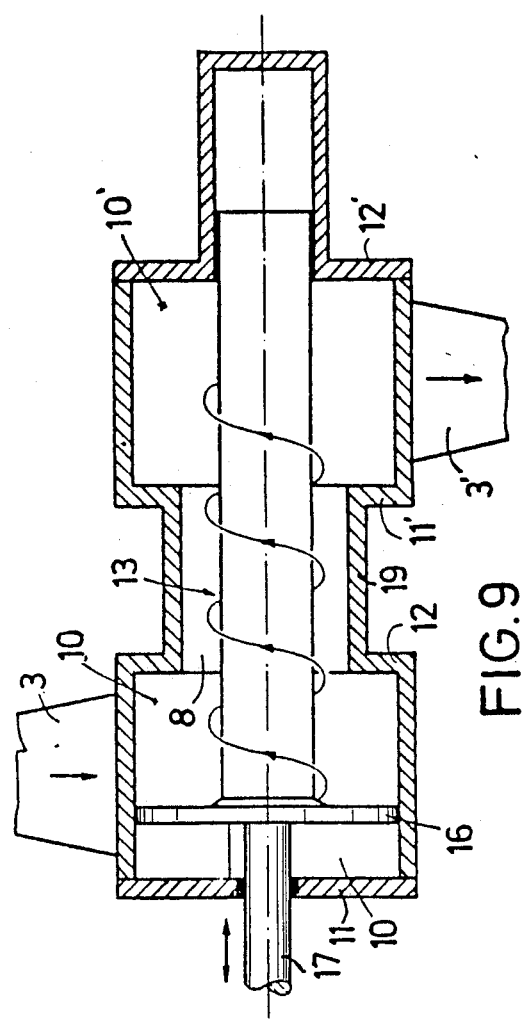
FIG. 9 shows an eighth embodiment according to the invention.

FIG. 9 shows an eighth embodiment in which two "basic forms" of the invention are interconnected. As can be seen from FIG. 9 the two chambers 10 and 10' are connected with each other via a cylindrical pipe section 19. A core 13 disposed displaceably in longitudinal direction extends along the longitudinal axis of the two chambers, which has an actuator 16 at the end located in the chamber 10. A rod 17 adjoins the actuator 16, which is firmly connected to the oblong core 13 and projects towards the outside beyond the chamber 10 via an opening in the lateral wall 11, which is not designated in detail. The core 13 extends with the end section opposite to the actuator 16 in a tubular closed continuation of the lateral wall 12'. This continuation and the opening in the lateral wall 11 of the chamber 10, which is not designated in detail, serve to guide the core 13 and to displace it. Also here the rod 17 is sealed with respect to the lateral wall 11. The inner diameter of the pipe section 19 is substantially larger than the outer diameter of the cylindical core.

A fluid flowing into the chamber 10 through the tangential flow duct 3 forms in this chamber 10 a spiral flow eddy, the fluid circulating around the outer surface of the oblong core 13 several times. The fluid flow circulating around the core 13 moves in axial direction through the pipe section 19 into the chamber 10', where the fluid flow is also present in the form of a spiral potential eddy. The flow leaves the chamber 10' through the tangential flow duct 3'. The orientation of the tangential flow ducts 3 and 3' is adapted to the direction of circulation of the respective fluid potential eddy.

The embodiment represented in FIG. 9 can be compared to the working method of a Venturi tube, because fluid entering the chamber 10 under higher pressure at low speed reaches within the pipe section 19 a high flow rate at low pressure and this high fluid flow rate is reduced in the chamber 10', a pressure being build up again in the tangential flow duct 3'. By means of the axial displacement of the core 13 the rate of flow through the entire device can be adjusted due to the performance of the actuator 16, as already discussed above. In identical chambers 10 and 10' one obtains the same conditions as in a Venturi tube without actuator 16, but with core 13 or with fully opened chamber 10.

In the embodiments described so far the use of a fluid potential eddy according to the invention was described in connection with devices, in which the oblong core was stationary or displaceable. However, devices are also covered by the invention in which a rotatably disposed core is provided, which is disposed in a chamber with a circumferential wall which extends along a circular arc or spiral arc. As already mentioned the selection of the type of the curvature of the circumferential wall depends on the flow conditions in the transition area between the circumferential wall and the flow duct ending tangentially in the chamber. In this respect it is of importance how much the flow rate has changed after one circulation along the circumferential wall. In other words this means that it must be taken into consideration whether two flow layers present in the transition area between the tangential flow duct and the chamber and coming into contact with each other have a higher speed difference or not.

Figure 10:
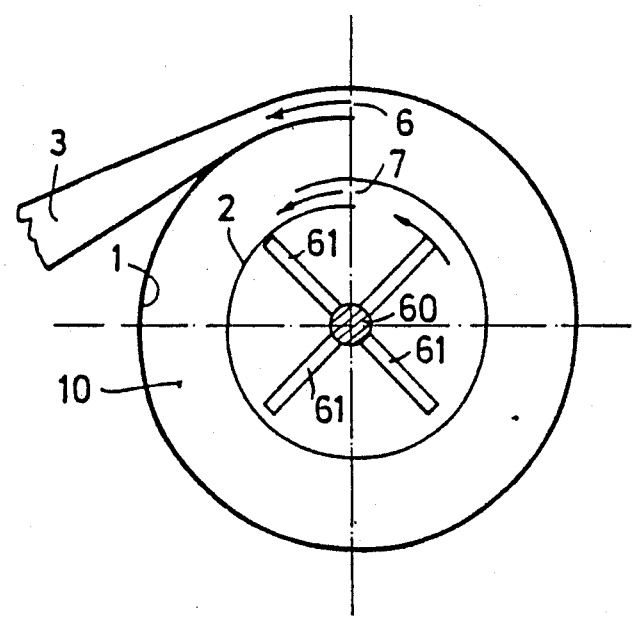
FIG. 10 shows a ninth embodiment according to the invention.

FIG. 10 shows a schematic representation of a cross-section of a device according to the invention with a rotatably disposed core 60. A circumferential wall 1 limiting the chamber 10 extends along a spiral arc. A flow duct 3 adjoins this circumferential wall 1 tangentially. The transition area between the interior of the chamber 10 and the connecting end of the flow duct 3 is designated with 6. A spiral guide surface 2 is stationarily disposed within the circumferential wall 1 so that the chamber 10 is subdivided into an inner chamber and an annular chamber, the latter being limited by the circumferential wall 1 and the spiral guide surface 2. Not recognizable lateral walls are provided in FIG. 10 so that on the whole a housing is formed.

An oblong core 60 is rotatably mounted in the inner chamber of the chamber 10. Guide elements 61 extend radially outwardly from the core 60. The radial extension of the guide elements 61 is selected so that a free rotation of the core 60 about its longitudinal axis is possible. The rotatable core 60 is rotatably mounted in a bearing means, which is fastened to at least one of the lateral walls (not shown). There is furthermore a passage opening in at least one of the lateral walls so that the inner chamber of the chamber 10 located within the spiral guide surface 2 has a flow connection to the outside of the device.

It is now assumed that the device according to FIG. 10 is filled with a liquid. The passage opening in at least one of the lateral walls is to be flow-connected with a liquid stock and the rotatable core 60 is to be drive-connected with a driving means such as a motor (not shown). If the core 60 is set rotating by the driving means, the guide elements 61 fastened to the core 60 are also rotated. Due to this the liquid in the inner chamber of the chamber 10 is set rotating and gets through the passage area 7 which is limited in radial direction by the end sections of the spiral guide surface 2 into the already mentioned annular chamber of the chamber 10. A spiral liquid flow develops in this annular chamber and the liquid layer flowing along the circumferential wall 1 gets through the passage area 6 into the tangential flow duct 3 and from there to the outside.

Since liquid is conveyed into the annular chamber from the interior chamber, a partial vacuum is formed in the interior chamber so that liquid is sucked in from the liquid stock through the passage opening in at least one of the lateral walls which is in flow-connection with the interior chamber.

It is advantageously possible with a device according to FIG. 10 to build up a relatively high liquid pressure in the tangential flow duct 3. The magnitude of the pressure built up in the tangential flow duct 3 depends i.a. on the number of revolutions of the core 60 and thus on the inlet speed the liquid has when entering the passage area 7 and on the radial dimension of the circumferential wall 1. Also the cross-sectional surface of the passage area 6 plays furthermore a role, because due to the continuity equation the amount of liquid flowing in each case through the passage areas 6 and 7 must be equally large per time unit. The The amount passing depends in turn on the respective flow rate in these areas.

If the radial extension of the guide elements 61 is independent from the rotational position of the core 60, the interspace between the ends of the guide elements 61 and the inner surface of the spiral guide surface 2 is changed during one rotation as a functon of the rotational position. To achieve with the guide elements 61 a good conveying of the fluid, which was assumed to be a liquid in this example, the guide elements can also be designed within the framework of the invention so that their radial extension is changed as a function of the rotational position of the core 60.

The device with rotatable core according to the invention according to FIG. 10 has very low losses in its operation, because favourable flow conditions ensue.

Figure 11:
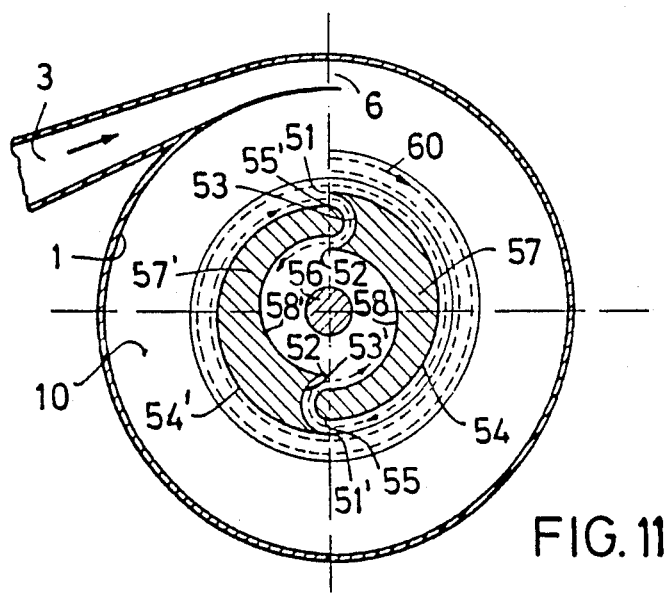
FIG. 11 shows a tenth embodiment according to the invention.

It is also possible within the framework of the invention to use the fluid eddies produced in a chamber with circular-arc-shaped or spiral-arc-shaped circumferential wall to set a rotatable core rotating. An example according to the invention for this is represented in FIG. 11.

In a chamber 10 limited by a circular-arc-shaped or spiral-arc-shaped circumferential wall 1 a rotatable core 50 is disposed. A flow duct 3 ends tangentially in the chamber 10, the passage area from the flow duct 3 into the chamber 10 being designated with 6. Lateral walls are provided, which cannot be recognized in FIG. 11 representing a radial section which form a housing together with the circumferential wall 1. A rotatable core designated in general with 56 is disposed in the chamber 10 and is mounted on a rotating shaft, which extends through at least one of the side walls. In the representation according to FIG. 11 the core 56 has two bent guide elements 57 and 57'. The two guide elements 57 and 57' have outer cylinder surfaces 54 and 54' being concavely bent inwardly, the geometrical place of the generatrix of these cylinder surfaces 54 and 54' being a spiral arc. The inner surfaces 58 and 58' are cylinder surfaces bent in the direction towards the axis of the core. The ends 51 and 52 of the outer surface 54 and the inner surface 58 of the guide element 57 are connected with each other via a flow surface 53, which is arched into the chamber formed by the outer surface 54 and the inner surface 58. The flow surface 53 is also a cylindrical surface. The geometrical place of the generatrix of this flow surface 53 is in this example a half-circle. In the end area 55 of the guide element 57 which is opposite to the flow surface 53 the outer surface 54 and the inner surface 58 are connected to each other via a circular-arc-shaped cylinder surface.

The guide element 57' is designed in the same fashion as the guide element 57 so that the preceding description applies also to the outer surface 54', the inner surface 58', the ends 51' and 52' of these surfaces, the flow surface 53' and the end area 55' of the guide element 57'.

As already mentioned the core 56 comprising the guide elements 57 and 57' is rotatably mounted. A passage opening, preferably a passage opening being concentrical to the axis of rotation of the core 56 is provided in at least one of the side walls (not shown).

The working method of the device according to the invention, which is represented by way of example in FIG. 11 is described for the case that the fluid is a liquid. It is assumed that the chamber 10 is filled with a liquid. Further liquid is to flow into the chamber through the tangential flow duct 3. This liquid flowing in gets through the passage area 6 into the interior of the chamber 10 and a spiral flow develops in the chamber 10 which has—as is provided within the framework of the invention—the form of a spiral potential liquid eddy. In the representation according to FIG. 11 the spiral potential liquid eddy rotates in clock-wise direction. A section of the spiral flow path is designated with the reference numeral 60, which is already very close to the rotatable core 56. If one follows this flow path 60 in clockwise direction, it can be recognized that this flow path is divided into a portion at the radially outer connecting edge between the flow surface 53 and the outer surface 54 of the guide element 57, which enters between the connecting edge 51 of the flow surface 53 and the outer surface 54 and the end area 55' of the guide element 57' and is deflected towards the interior of the core 56 by the flow surface 53. The other portion of the flow path 60 continuous to flow at the outer surface 54 of the guide element 57 and gets finally into the passage area which is limited by the connecting edge 51' between the outer surface 54' and the flow surface 53' of the guide element 57' and the end area 55 of the guide element 57. The liquid flowing through this area impinges on the flow surfaces 53' and is deflected by the same towards the interior of the core 56. The liquid deflected into the interior of the core 56 can get towards the outside of the chamber 10 through the already mentioned passage opening in one of the lateral walls.

The outer surfaces 54 and 54' of the guide elements 57 and 57' are bent in such fashion that the curvature has substantially the same course as that of the flow paths adjacent to the outer surfaces 54 and 54'.

The passage areas through which the liquid gets into the interior of the core 56 must be dimensioned in such fashion that their cross-sectional surfaces are adapted to the cross-sectional surface of the passage area between the tangential flow duct 3 and the interior of the chamber 10. Also here the flow rate of the liquid in the respective passage area plays a part, because the amount of liquid flowing through the passage area 6 is equal to the amount of liquid flowing through the passage areas between the ends of the guide elements 57 and 57'.

In the embodiment represented in FIG. 11 two guide elements 57 and 57' are provided to the respective flow surfaces 53 and 53' of which liquid is applied so that the core 56 is set rotating thereby. However, also more than two guide elements can be provided, the passage areas between the respective ends of the guide elements having to be designed in such fashion in view of their cross-sectional surfaces and the respectively present flow rates that the conditions resulting from the continuity equation are fulfilled as good as possible.

Due to the fact that a spiral potential liquid eddy is provided with several circulations and the outer surfaces of the guide elements are designed in accordance with the spiral flow paths it is advantageously achieved that a continuous impingement of the flow surfaces with the fluid is achieved. Due to this extremely low vibrations and losses ensue and also the risk of a cavitation is extremely small.

The device according to the invention described above can also be operated so that the rotatable core 56 is driven by a driving means, the direction of rotation being then opposite, i.e. the rotatable core 56 rotates then counter-clockwise. In this case the device acts as a conveying device for a fluid which axially enters through the passage opening provided in at least one of the side walls into the interior of the core and is conveyed by the flow surfaces of the guide elements into the chamber surrounding the core, in which a spiral fluid potential eddy results then. The fluid or the liquid enters the tangential flow duct at the circumference of the chamber.

Thus it results in summary that according to the basic idea of the invention a rotating spiral fluid potential eddy is produced in a chamber with circular-arc-shaped or spiral-arc-shaped circumferential wall in such fashion that the fluid circulates several times around the axis of the chamber upon flowing through the chamber. The spiral fluid potential eddy is built up in such fashion that for two optional points $P_1$ and $P_2$ of the spiral fluid potential eddy $w_1 r_1^n = w_1 r_2^n$ applies substantially, $r_i$ being the radial distance from the axis of the eddy, $w_i$ the respectively present flow rate of the fluid and n being a constant, for which $0 > n < \infty$ applies. n is preferably greater than or equal to 1. The value for n depends on the respectively aimed at object for which a device according to the invention is to be used.

It is still pointed out that the devices according to the invention can be operated or used with liquid, gaseous and vaporous fluids. It is furthermore pointed out that with devices according to the invention the pipe flow resistance in the pipe adjoining a device according to the invention, in which the fluid moves spirally, can be reduced. This means in other words that, as compared with a purely axial flow, a flow extending spirally in axial direction has a lower friction loss so that less energy which is contained by the fluid is emitted by the fluid along that pipe section in which the flow still has a rotational component.

I claim:

1. A device for transforming a fluid flow of a first type into a fluid flow of a second type, said device comprising a chamber having two lateral end walls and a circumferential wall extending between the lateral end walls, a flow duct forming a passage area disposed substantially tangentially to the circumferential wall and in communication with the chamber, a passage opening formed in one of said lateral end walls, the circumferential wall extending along a somewhat arcuate path, an oblong core disposed in the chamber, said core having a circular cross-section with a central longitudinal axis which coincides with the axis of the circular arc of said circumferential wall and which extends through the passage opening formed in said lateral end wall, an annular gap formed between said core and said passage opening, said gap having two optional points ($P_1$, $P_2$) where fluid flows between the passage area and the external surface of the axial core and having the condition $w_1 r_1^n = w_2 r_2^n$ substantially fulfilled, with $r_1$ being the radial distance of the point $P_1$ measured from the center of the circular arc, $w_i$ being the flow rate of the fluid at the point $P_i$ and n being a constant with $0 < n < \infty$, and an actuator means slidably mounted between said end walls within said chamber for supporting said oblong core for movement within said passage opening.

2. The device according to claim 1 wherein a second flow duct is connected to the passage opening in the one end wall through which the oblong core extends, said second flow duct having an inner wall which is spaced from the surface of the oblong core.

3. The device according to claim 2 wherein the cross-sectional surface of the flow duct adjoining the passage opening in the one end wall is an enlarging tapering.

4. The device according to claim 1, wherein the oblong core has a continuous inner flow duct extending in a longitudinal direction along the oblong core and extending to a second lateral end wall which is opposite said one end wall with the passage opening, the inner flow duct ending outside the chamber on the second end wall.

5. The device according to claim 4 and, a second oblong core disposed in the inner flow duct of the first mentioned oblong core, said second oblong core having a circumferential surface which is spaced from the inner wall of the inner flow duct, the second oblong core extending beyond the end of the first mentioned oblong core on the annular gap side.

6. The device according to claim 5 wherein the second oblong core has at least one section tapering in the direction toward one of its ends.

7. The device according to claim 6 wherein the tapered section of the second oblong core extends beyond the first mentioned oblong core and comprises at least one guide element by means of which at least part of the fluid flow can be deflected with turbulence in the direction of an axial flow.

8. The device according to claim 6 wherein the passage area has a rectangular cross-section.

9. The device according to claim 1 wherein the actuator means is a plate extending from the first mentioned oblong core toward the circumferential wall of the chamber.

10. The device according to claim 9 wherein the actuator extends vertically to the longitudinal axis of the first mentioned oblong core.

11. The device according to claim 1 wherein the oblong core is movable along its longitudinal axis and the actuator is attached to move with it.

12. The device according to claim 11 and a movable actuation means on said oblong core and extending toward the exterior of the chamber, said actuation means being firmly connected to the oblong core within the chamber.

13. The device according to claim 1 wherein the oblong core is displaceable along its longitudinal axis and extends through said passage opening in said one end wall independently of its displacement position, the actuator being attached to move with displacement of the oblong core.

14. The device according to claim 1 wherein the oblong core comprises at least one section which tapers in the direction of the annular gap.

15. The device according to claim 1 wherein the oblong core has a section which tapers toward said annular gap, the tapered section of the core extending through the passage opening and beyond the end wall, said tapered section having at least one guide element, by means of which at least part of the fluid flow can be deflected with turbulence in the direction of an axial flow.

16. The device according to claim 1 wherein the oblong core is a hollow cylinder having a closed end extending beyond the one end wall, at least one passage slot extending parallel to the cylindrical axis formed in the casing surface of the hollow oblong core cylinder, the oblong core being displaceable in the direction of the cylinder axis and sealingly guided in the passage opening.

17. The device according to claim 1 and a spiral guide surface disposed stationarily in the chamber and between the oblong core and the circumferential wall, said spiral guide extending between the lateral walls and at an angle of substantially 360° and being oriented in the same direction as the flow duct disposed tangentially to the chamber wall, said passage opening formed in said one end wall ending within the spiral guide surface, the oblong core being disposed to rotate about its longitudinal axis, and guide means extending radially up to a close proximity of the surface of the spiral guide surface.

18. The device according to claim 1 wherein said passage area of the flow duct ends tangentially in the chamber and extends substantially across the width of the circumferential wall.

19. The device according to claim 18 wherein said passage area has a substantially trapezoidal cross-section which tapers to one of the lateral walls.

20. The device according to claim 18 and means for changing the cross-sectional surface of the passage area.

21. A device for transforming a fluid flow of a first type into a fluid flow of a second type comprising a cylindrical chamber which is limited on opposite ends by two lateral end walls and on the sides by a concave circumferential wall extending between the lateral end walls, a flow duct forming a passage area disposed substantially tangentially to the circumferential wall and ending in the chamber, and a passage opening in one of said lateral end walls, the circumferential wall extending along a somewhat arcuate pate, an oblong core rotatably disposed within the chamber, said core having a circular cross-section and a longitudinal central axis coinciding with the axis of the somewhat arcuate path, the core having at least two adjacent guide elements with a first cylindrical surface, each of said guide elements pointing to the circumferential wall and a second cylindrical surface adjoining the first cylindrical surface, said second cylindrical surface extending approximately toward the longitudinal axis of the core, the geometrical location of the respective generatrix of the first cylindrical surface being a spiral arc section adapted to fix the course of the fluid flow, the geometrical location of the respective generatrix of the second cylindrical surface being a section of a curve, the two generatrices extending in parallel to the longitudinal axis of the core, a tangent at the spiral arc section and a tangent at the curve section forming an acute angle, a passage gap extending toward the center of the core being formed between the two adjacent guide elements, the coreside opening areas of the passage gap being in fluid communication with the passage opening, two optional points ($P_1$, $P_2$) of the fluid flow between a first passage area and the outer surface of guide elements of the core having substantially the condition $w_1 r_1^n = w_2 r_2^n$, with $r_i$ being the radial distance of the point $P_i$ from the center of the arcuate path, $w_i$ being the flow rate of the fluid at the point $P_i$ and n being a constant with $0 < n < \infty$.

* * * * *